United States Patent
Ko et al.

(10) Patent No.: US 8,064,305 B2
(45) Date of Patent: Nov. 22, 2011

(54) METHOD OF AND APPARATUS FOR MANAGING DISC DEFECTS IN DISC, AND DISC ON WHICH DEFECTS ARE MANAGED

(75) Inventors: Jung-won Ko, Suwon-si (KR);
Kyung-geun Lee, Geongnam-si (KR);
Sung-hee Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 377 days.

(21) Appl. No.: 12/104,716

(22) Filed: Apr. 17, 2008

(65) Prior Publication Data

US 2008/0212435 A1 Sep. 4, 2008

Related U.S. Application Data

(63) Continuation of application No. 11/430,906, filed on May 10, 2006, now abandoned, which is a continuation of application No. 10/663,981, filed on Sep. 17, 2003, now Pat. No. 7,463,564.

(30) Foreign Application Priority Data

Oct. 10, 2002 (KR) .................................. 2002-61897

(51) Int. Cl.
*G11B 7/00* (2006.01)
(52) U.S. Cl. ................... 369/53.17; 369/47.15; 714/710
(58) Field of Classification Search .............. 369/47.14, 369/53.17, 53.15
See application file for complete search history.

(56) References Cited

U.S. PATENT DOCUMENTS

| | | | |
|---|---|---|---|
| 4,835,757 A | 5/1989 | Abiko |
| 6,160,778 A | 12/2000 | Ito et al. |
| 6,367,038 B1 | 4/2002 | Ko |
| 6,385,148 B2 | 5/2002 | Ito et al. |
| 6,564,345 B1 | 5/2003 | Kim et al. |
| 6,628,602 B2 | 9/2003 | Ohno et al. |
| 7,027,373 B2 | 4/2006 | Ueda et al. |
| 7,072,256 B2 | 7/2006 | Ueda et al. |

(Continued)

FOREIGN PATENT DOCUMENTS

CN 1338103 2/2002

(Continued)

OTHER PUBLICATIONS

Japanese Office Action issued on Feb. 16, 2010, in corresponding Japanese Application No. 2004-542895 (3 pages).

(Continued)

*Primary Examiner* — Jorge Ortiz Criado
(74) *Attorney, Agent, or Firm* — NSIP Law

(57) ABSTRACT

A method of and apparatus for managing disc defects in a disc using a temporary defect management area in the disc, and the disc, where the method includes recording in a data area user data; and recording in a temporary defect management area, which is present in at least one of a lead-in area and a lead-out area, which temporary defect information and temporary defect management information regarding the user data recorded in the data area are recorded. Accordingly, the method and apparatus are applicable to recordable discs and capable of effectively using the defect management area.

5 Claims, 8 Drawing Sheets

U.S. PATENT DOCUMENTS

| | | | |
|---|---|---|---|
| 7,177,529 | B2 | 2/2007 | Yoshida et al. |
| 7,379,402 | B2 | 5/2008 | Ko et al. |
| 7,400,564 | B2 | 7/2008 | Ko et al. |
| 7,423,946 | B2 | 9/2008 | Ko et al. |
| 7,428,670 | B2 | 9/2008 | Hwang et al. |
| 7,463,564 | B2 | 12/2008 | Ko et al. |
| 2001/0026511 | A1 | 10/2001 | Ueda et al. |
| 2001/0043525 | A1 | 11/2001 | Ito et al. |
| 2003/0156471 | A1 | 8/2003 | Ueda et al. |
| 2004/0174785 | A1 | 9/2004 | Ueda et al. |

FOREIGN PATENT DOCUMENTS

| | | |
|---|---|---|
| EP | 0350920 | 1/1990 |
| EP | 0 997 904 | 5/2000 |
| EP | 1 132 914 | 9/2001 |
| JP | 02-023417 | 1/1990 |
| JP | 09-167446 | 6/1997 |
| JP | 09-190680 | 7/1997 |
| JP | 11-066751 | 3/1999 |
| JP | 2001-325773 | 11/2001 |
| JP | 2001-351314 | 12/2001 |
| JP | 2002-0007321 | 1/2002 |
| JP | 2002-109834 | 4/2002 |
| JP | 2003-505813 | 2/2003 |
| JP | 2006-500724 | 1/2006 |
| JP | 2006-512699 | 4/2006 |
| KR | 2002-7321 A | 1/2002 |
| WO | WO 01/06512 A1 | 1/2001 |
| WO | WO 01/75879 A1 | 10/2001 |
| WO | WO 2004/029668 | 4/2004 |
| WO | WO 2004/029941 | 4/2004 |

OTHER PUBLICATIONS

Office Action issued by the Korean Intellectual Property Office on Nov. 20, 2006 in Korean Patent Application No. 2002-61897.
Search Report issued in European Patent Application No. 03807997.6 on Feb. 15, 2008.
Office Action issued in Chinese Patent Application No. 200710126966.X on May 15, 2009.
Office Action issued in Japanese Patent Application No. 2004-542895 on Jun. 9, 2009.
U.S. Appl. No. 10/663,981, filed Sep. 17, 2003, Jung-Wan Ko et al., Samsung Electronics Co., Ltd.
U.S. Appl. No. 11/617,798, filed Dec. 29, 2006, Jung-Wan Ko et al., Samsung Electronics Co., Ltd.
U.S. Appl. No. 11/430,906, filed May 10, 2006, Jung-Wan Ko et al., Samsung Electronics Co., Ltd.
U.S. Appl. No. 10/638,481, filed Aug. 12, 2003, Jung-Wan Ko et al., Samsung Electronics Co., Ltd.
U.S. Appl. No. 10/670,363, filed Sep. 26, 2003, Sung-hee Hwang et al., Samsung Electronics Co., Ltd.
U.S. Appl. No. 10/638,555, filed Aug. 12, 2003, Jung-Wan Ko et al., Samsung Electronics Co., Ltd.
U.S. Appl. No. 11/046,882, filed Feb. 1, 2005, Jung-Wan Ko et al., Samsung Electronics Co., Ltd.
U.S. Appl. No. 11/430,972, filed May 10, 2006, Jung-Wan Ko et al., Samsung Electronics Co., Ltd.
U.S. Appl. No. 12/039,969, filed Feb. 29, 2008, Ko et al., Samsung Electronics Co., Ltd.
U.S. Appl. No. 10/638,551, filed Aug. 12, 2003, Jung-Wan Ko et al., Samsung Electronics Co., Ltd.
First page of WO 00/54274, publication date Sep. 14, 2000, Ito et al., containing English abstract, submitted as English abstract of counterpart KR 2002-7321 A listed above (1 page).
International Search Report issued on Jan. 12, 2004, in counterpart International Application No. PCT/KR2003/001938 (4 pages).
Japanese Office Action issued on Oct. 20, 2009, in counterpart Japanese Application No. 2004-542895 (3 pages, in Japanese, no English translation).
Extended European Search Report issued on Aug. 22, 2011, in counterpart European Application No. 11158052 (6 pages, in English).

METHOD OF AND APPARATUS FOR MANAGING DISC DEFECTS IN DISC, AND DISC ON WHICH DEFECTS ARE MANAGED

CROSS-REFERENCE TO RELATED APPLICATIONS

This application is a continuation of application Ser. No 11/430,906 filed on May 10, 2006, now abandoned, which is a continuation of application Ser. No. 10/663,981 filed on Sep. 17, 2003, now U.S. Pat. No. 7,463,564, which claims the benefit of Korean Patent Application No. 2002-61897 filed on Oct. 10, 2002, in the Korean Intellectual Property Office, the disclosures of which are incorporated herein by reference.

BACKGROUND OF THE INVENTION

1. Field of the Invention

The present invention relates to disc defect management, and more particularly, to a method of and an apparatus for managing disc defects using a temporary defect management area (TDMA), and a disc in which defect management is performed using the method and the apparatus.

2. Description of the Related Art

Defect management is a process of rewriting data stored in a user data area of a disc in which a defect occurs. The data is rewritten to a new portion of the disc's data area, thereby compensating for the data loss otherwise caused by the defect. In general, defect management is performed using a linear replacement method or a slipping replacement method. In the linear replacement method, the user data area in which the defect exists is replaced with a spare data area having no defects. In slipping replacement method, the user data area with the defect is slipped, and the next user data area having no defects is used.

Both the linear replacement and slipping replacement methods are applicable only to discs, such as a DVD-RAM/RW, on which data can be repeatedly recorded and recording can be performed using a random access method. In other words, the linear replacement and slipping replacement methods are difficult to apply to write-once discs on which recording is allowed only once.

In general, the presence of defects in a disc is detected by recording data on the disc, and then confirming whether the data has been recorded correctly on the disc. However, once the data is recorded on a write-once disc, it is impossible to overwrite the new data and manage the defects therein.

After the development of CD-R and DVD-R, a high-density write-once disc with a recording capacity of several dozen GBs was introduced. This type of disc can be used as a backup disc since it is inexpensive and allows random access that enables fast reading operations. However, since defect management is not available for write-once discs, a backup operation is discontinued when a defective area (i.e., an area where a defect exists) is detected during the backup operation. In general, since a backup operation is performed when a system is not frequently used, such as at night when a system manager does not operate the system, it is more likely that a discontinued backup operation is maintained discontinued for the night when it is stopped because a defective area of a write-once disc is detected such that the backup operation is not completely performed.

SUMMARY OF THE INVENTION

The present invention provides a defect management method and apparatus that can be applied to discs, and a disc having the defects managed using the defect management method.

The present invention also provides a defect management method and apparatus that can manage disc defects even when a defect is detected during a recording operation, enabling the recording operation without interruption, and a disc having the method.

Additional aspects and/or advantages of the invention will be set forth in part in the description which follows and, in part, will be obvious from the description, or may be learned by practice of the invention.

According to an aspect of the present invention, a disc includes a data area in which user data is recorded, and a temporary defect management area that is present in at least one of a lead-in area and a lead-out area and in which are recorded temporary defect information and temporary defect management information regarding the user data recorded in the data area.

It is preferable, but not required, that the temporary defect information and temporary defect management information are recorded for every recording operation in which user data is recorded in the data area.

Also, it is preferable, but not required, that the temporary defect information contains information indicating a position of a defective area of the data area in which corresponding user data is recorded, or contains information indicating a position of a replacement area that is a substitute for the defective area.

According to another aspect of the present invention, a method of managing disc defects in a disc includes recording defect information regarding data, which is recorded in a data area of the disc according to a recording operation, as temporary defect information in a temporary defect management area that is present in at least one of a lead-in area and a lead-out area of the disc; and recording management information for managing the temporary defect information as temporary defect management information in the temporary defect management area.

It is preferable, but not required, that the method further includes repeating the recording the defect information and the recording the management information for every recording operation; and recording a last recorded temporary defect management information and temporary defect information in a defect management area that is present in at least one of the lead-in area and the lead-out area.

The recording the last recorded temporary defect information is performed during finalization of the disc according to an aspect of the invention.

It is preferable, but not required, that the recording the defect information further includes recording information indicating a position of a defective area of the data area containing corresponding user data, as the temporary defect information; recording information indicating the position of a replacement area, which is a substitute for the defective area, as the temporary defect information; or sequentially recording the temporary defect information in a temporary defect information area included in the temporary defect management area, starting from a start of the temporary defect information area.

It is preferable, but not required, that the recording management information comprises sequentially recording the defect information in a temporary defect management information area included in the temporary defect management area, starting from an end of the temporary defect management information area.

According to yet another aspect of the present invention, a recording and/or reproducing apparatus for use with a disc includes a recording/reading unit that records data on or reads data from the disc; and a controller that controls the recording/reading unit to record defect information regarding the data, which is recorded in a data area of the disc according to a recording operation, as temporary defect information in a temporary defect management area that is present in at least one of a lead-in area and a lead-out area of the disc, and to record management information for managing the temporary defect information as temporary defect management information in the temporary defect management area.

It is preferable, but not required, that the controller controls the recording/reading unit to record the temporary defect information and the temporary defect management information in the temporary defect management area for every recording operation, and, during finalization of the disc, to record a last recorded temporary defect information and a last recorded temporary defect management information in a defect management area which is present in at least one of the lead-in area and the lead-out area of the disc.

According to still another aspect of the present invention, a recording apparatus for use with a disc includes a recording/reading unit that records data on or reads data from the disc; and a controller that controls the recording/reading unit to record defect information regarding first data, which is recorded in a data area of the disc according to a first recording operation, as first temporary defect information in a temporary defect management area that is present in at least one of a lead-in area and a lead-out area of the disc, to record first defect management information for managing the first temporary defect information as first temporary defect management information in the temporary defect management area, to record second defect information regarding second data, which is recorded in the data area according to a second recording operation, as second temporary defect information in the temporary defect management area, and to record defect management information for managing the second temporary defect information as second temporary defect management information in the temporary defect management area.

BRIEF DESCRIPTION OF THE DRAWINGS

The above and/or other aspects and advantages of the present invention will become more apparent and more readily appreciated by describing in detail embodiments thereof with reference to the accompanying drawings in which.

DETAILED DESCRIPTION OF THE EMBODIMENTS

Figure 1:
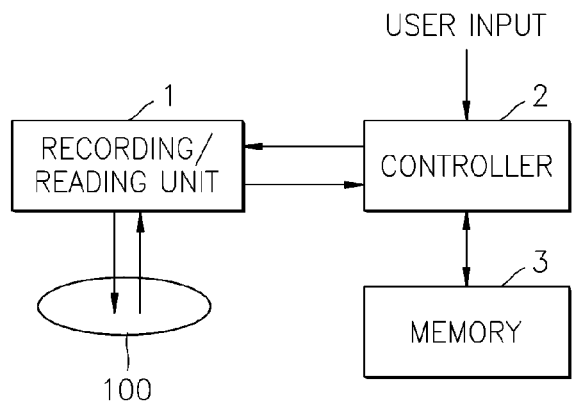
FIG. 1 is a block diagram of a recording and/or reproducing apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a recording and/or reproducing apparatus according to an embodiment of the present invention. Referring to FIG. 1, the recording and/or reproducing apparatus includes a recording/reading unit 1, a controller 2, and a memory 3. The recording/reading unit 1 records data on a disc 100, which is an information storage medium according to a first embodiment of the present invention, and reads back the data from the disc 100 to verify the accuracy of the recorded data. The controller 2 performs defect management according to an embodiment of the present invention. In the shown embodiment, the controller 2 uses a verify-after-write method in which data is recorded on the disc 100 in predetermined data units and the accuracy of the recorded data is verified to detect a defect in the recorded data. In other words, the controller 2 records user data on the disc 100 in units of recording operations, and verifies the recorded user data to detect an area (i.e., a defective area) of the disc 100 in which a defect exists. After the recording the data in the predetermined units, the controller 2 creates information that indicates a position of the defective area of the disc 100 as temporary defect information and stores the created temporary defect information in the memory 3. If the amount of the stored information reaches a predetermined level, the controller 2 records the stored information as defect information on the disc 100.

Here, the recording operation is a unit of work determined according to a user's intention or is a recording work to be performed. According to this embodiment, a recording operation indicates a process in which the disc 100 is loaded into the recording and/or reproducing apparatus, data is recorded on the disc 100, and the disc 100 is taken out from the recording and/or reproducing apparatus. During the recording operation, data is recorded and verified at least once. In general, data is recorded and verified several times. Defect information, which is obtained using the verify-after-write method, is temporarily stored in the memory 3.

When a user presses the eject button (not shown) of the recording and/or reproducing apparatus in order to remove the disc 100 after recording data, the controller 2 expects the recording operation to be terminated. Next, the controller 2 reads the information stored in the memory 3, provides the read data to the recording/reading unit 1, and controls the recording/reading unit 1 to record the read data on the disc 100.

If the recording of data on the disc 100 is completed (i.e., no more data will be recorded on the disc 100 and the disc 100 is to be finalized), the controller 2 records the temporary defect information and the temporary defect management information in a defect management area of the disc 100.

During reproduction, the recording and/or reproducing apparatus utilizes the defect information and the defect management information in the defect management area and/or the temporary defect management area in order to access the recorded user data. While described in terms of a recording and/or reproducing apparatus as shown in FIG. 1, it is understood that the apparatus can be an individual recording or reproducing apparatus or a recording and reproducing apparatus.

Figure 2A:
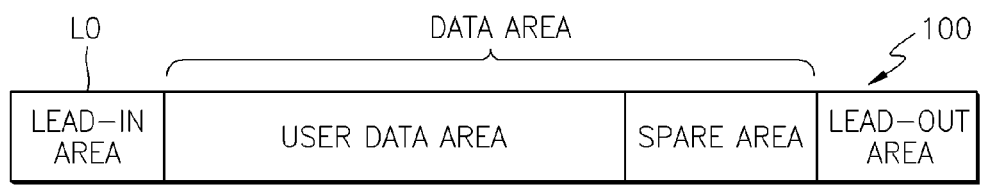
FIGS. 2A and 2B illustrate structures of a disc according to embodiments of the present invention.
Figure 2B:
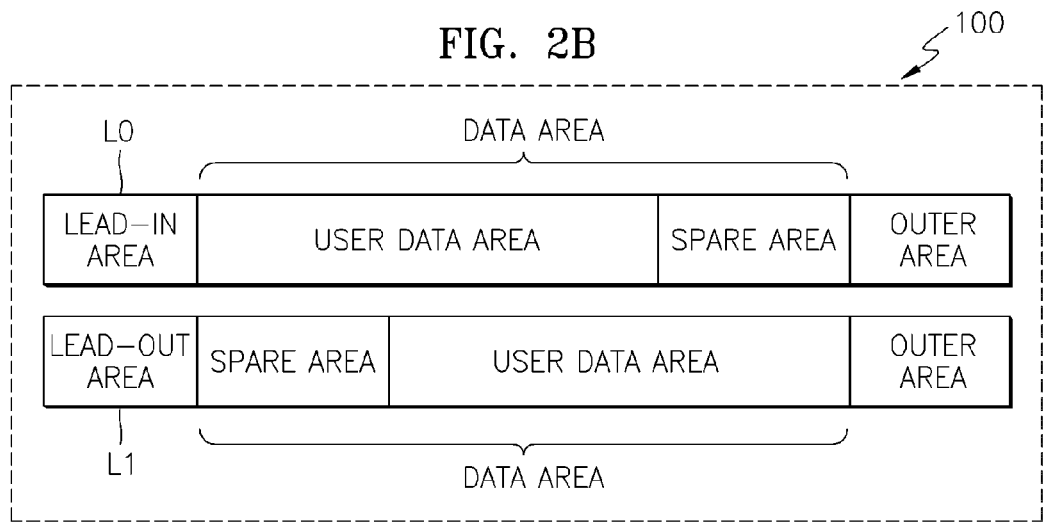

FIGS. 2A and 2B illustrates structures of the disc 100 of FIG. 1 according to embodiments of the present invention. FIG. 2A illustrates in detail a single record layer disc representation of disc 100 having a record layer L0. The disc 100 includes a lead-in area, a data area, and a lead-out area. The lead-in area is located in an inner part of the disc 100, and the lead-out area is located in an outer part of the disc 100. The data area is present between the lead-in area and the lead-out area, and is divided into a user data area and a spare area.

The user data area is an area of the data area where user data is recorded. The spare area is an area of the data area other than the user data area which is the replacement area for a portion of the user data area having a defect. The spare area serves to compensate for a loss in the recording area due to a defect in the user data area. On the assumption that defects may occur within the disc 100, it is preferable, but not required, that the spare area assumes 5% of the entire data capacity of the disc 100, so that a greater amount of data can be recorded on the disc 100.

FIG. 2B illustrates a double record layer disc representation of disc 100 having two record layers L0 and L1. A lead-in area, a data area, and an outer area are sequentially formed from the inner part of the first record layer L0 to the outer part of the first layer L0. Also, an outer area, a data area, and a lead-out area are sequentially formed from the outer part of the second record layer L1 to the second record layer L1 inner part. Unlike the single record layer disc 100 of FIG. 2A, the lead-out area is present in the inner part of the disc 100 of FIG. 2B. That is, the disc 100 of FIG. 2B has an opposite track path (OTP) in which data is recorded starting from the lead-in area of the first record layer L0 and continuing toward the outer area of the first record layer L0, and continuing from the outer area of the second record layer L1 to the lead-out area of the second record layer L1. The spare area is allotted to each of the record layers L0 and L1.

In the embodiments of FIGS. 2A and 2B, the spare areas are present between the user data area and the lead-out area and between the user data area and the outer area. If necessary, a portion of the user data area may be used as another spare area. Specifically, more than one spare area may be present between the lead-in area and the lead-out area.

Figure 3:
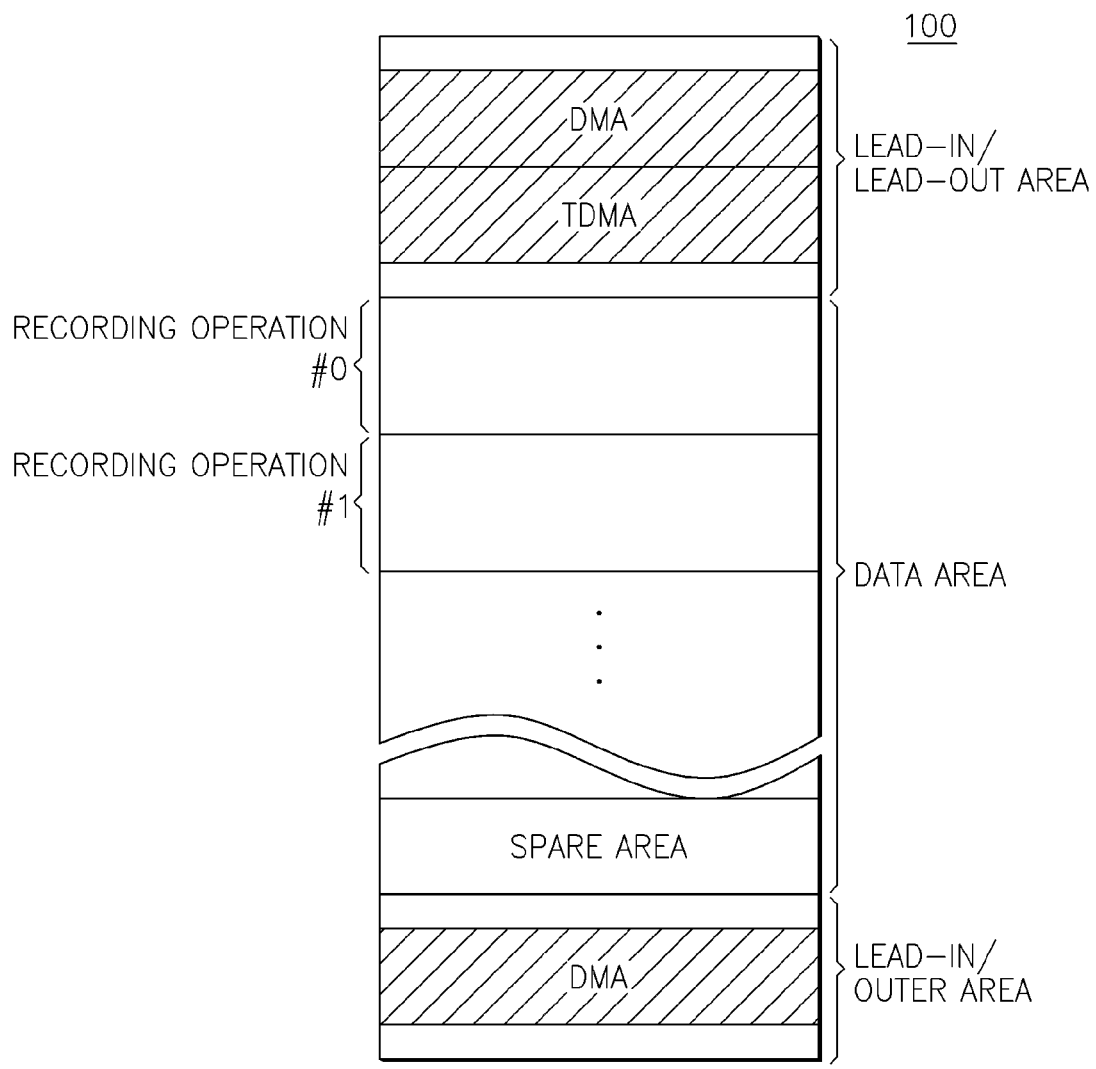
FIG. 3 illustrates data structures of the discs of FIGS. 2A and 2B according to an embodiment of the present invention.

FIG. 3 illustrates details of the structures of the disc 100 according to an embodiment of the present invention. Referring to FIG. 3, a temporary defect management area is present in at least one of the lead-in area, the lead-out area, and the outer area of the disc 100. Also, a temporary defect management area is present at least one of the lead-in area and the lead-out area.

In general, information that relates to managing defects in the disc 100 is recorded in a defect management area. Such information includes the structure of the disc 100 for defect management, a position of defect information, whether defect management is performed, and a position and a size of the spare area. In the case of a write-once disc, new data is generally recorded after previously recorded data when the previously recorded data changes according to an aspect of the invention.

In general, when a disc is loaded into a recording/reproducing apparatus such as that shown in FIG. 1, the apparatus reads data from the lead-in area and the lead-out area of the disc 100 to determine how to manage the disc 100 and record data on or read data from the disc 100. However, if the amount of data recorded in the lead-in area increases, a longer time is spent preparing the recording or reproducing of data after the loading of the disc. Accordingly, the present invention proposes temporary defect management information and temporary defect information. The temporary defect management information and the temporary defect information are recorded in a temporary defect management area that is formed in the lead-in area and/or the lead-out area.

According to an embodiment of the present invention, the defect management is performed using the linear replacement method. Thus, the temporary defect information includes information indicating the position of a defective area of the disc 100, and information indicating a portion of the disc 100 that can be a replacement area for the defective area. The temporary defect management information is used to manage the temporary defect information and includes information indicating the point of the disc 100 where the temporary defect information is recorded.

According to an embodiment of the present invention, the temporary defect information and the temporary defect management information are recorded every time a recording operation ends. The temporary defect management area includes temporary defect information #0 and temporary defect information #1. The temporary defect information #0 includes information regarding a defect occurring in data recorded during recording operation #0 and information regarding a replacement area. The temporary defect information #1 includes information regarding a defect occurring in data recorded during recording operation #1 and information regarding a replacement area as temporary defect information #1. Further, the temporary defect management area includes temporary defect management information #0, #1. The temporary defect management information #0, #1 includes corresponding information for managing the temporary defect information #0, #1.

If no more data can or is to be recorded on the disc 100 or if a user does not want to record more data on the disc 100 (i.e., the disc 100 needs to be finalized), the temporary defect information recorded in the temporary defect information area and the temporary defect management information recorded in the temporary defect management information area are recorded in the defect management area.

A reason for recording the temporary defect management information and the temporary defect information in the defect management area (DMA) again will now be explained. When no more data will be recorded on the disc 100 (i.e., the disc 100 needs to be finalized), the temporary defect management information and the temporary defect information, which are updated several times, are moved to the defect management area of the lead-in area, thereby enabling fast reading of the information recorded in the disc 100. Also, it is possible to increase the reliability of information by recording the defect management information in a plurality of areas.

In an embodiment of the invention, the defect information recorded in the temporary defect information areas #0 through #i−1 is accumulatively recorded in a temporary defect information area #i. Therefore, it is sufficient to read the defect information from the last recorded temporary defect information #i and again record the read information in the DMA during the finalization of the disc 100.

For a high-density disc with a recording capacity of several dozen GBs, it is generally desirable that a cluster is allocated to an area in which temporary defect management information #i is recorded, and four to eight clusters are allocated to an area in which temporary defect information #i is recorded. This is because it is generally preferable to record new information in units of clusters to update information when a minimum physical unit of record is a cluster, although the amount of the temporary defect information #i is just several KBs. A total amount of defects allowed in a disc 100 is preferably about 5 percent of the disc recording capacity. For instance, about four to eight clusters are required to record temporary defect information #i, considering that information regarding a defect is about 8 bytes long and the size of a cluster is 64 KB long.

A verify-after-write method can be performed on temporary defect information #i and temporary defect management information #i according to an aspect of the invention. When a defect is detected, information recorded in the defective area of the disc 100 containing the defect may be either recorded in a spare area using the linear replacement method, or recorded in an area adjacent to the defective area using the slipping replacement method.

Figure 4A:
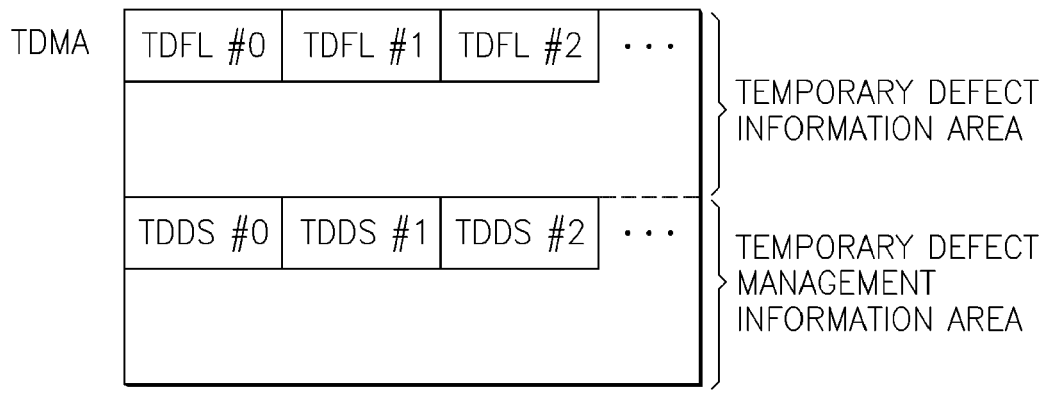
FIGS. 4A through 4D illustrate data structures of a defect management area according to embodiments of the present invention.

FIGS. 4A through 4D illustrate data structures of a temporary defect management area (TDMA) according to embodiments of the present invention. Referring to FIG. 4A, a temporary defect management area is logically divided into two parts: a temporary defect information area, and a temporary defect management information area. Temporary defect information TDFL #0, TDFL #1, TDFL #2 are sequentially recorded in the temporary defect information area, starting from a start of the temporary defect information area toward the end thereof. Temporary defect management information TDDS #0, TDDS #1, TDDS #2 are sequentially recorded starting from a start of the temporary defect management information area toward the end thereof. The temporary defect management information TDDS #0, TDDS #1, and TDDS #2 correspond to temporary defect information TDFL #0, TDFL #1, TDFL #2, respectively.

Figure 4B:
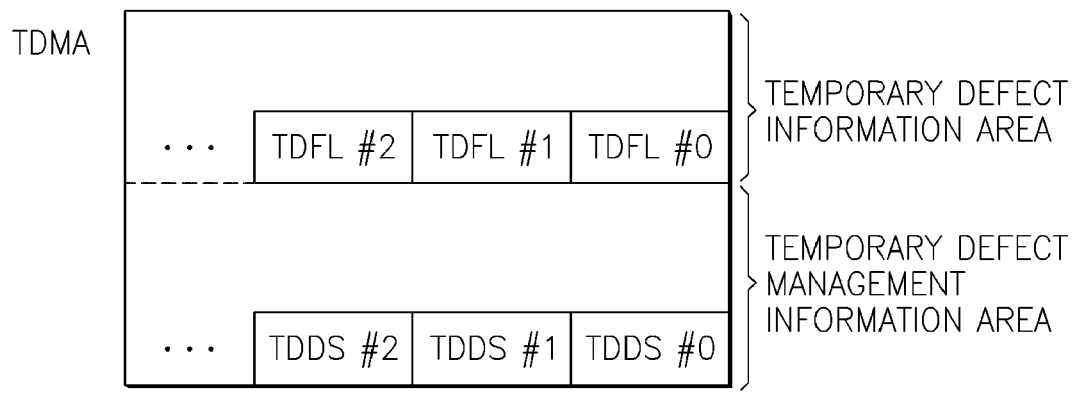

Referring to FIG. 4B, a temporary defect management area is logically divided into two parts: a temporary defect information area and a temporary defect management information area, as shown in FIG. 4A. However, the sequence of recording information in the temporary defect information area and the temporary defect management information area is not the same as the sequence of recording information in those of FIG. 4A. In detail, temporary defect information TDFL #0, TDFL #1, TDFL #2 are sequentially recorded starting from an end of the temporary defect information area toward the start thereof. The temporary defect management information TDDS #0, TDDS #1, TDDS #2 are sequentially recorded starting from an end of the temporary defect management information area toward the start thereof. The temporary defect management information TDDS #0, TDDS #1, and TDDS #2 correspond to temporary defect information TDFL #0, TDFL #1, and TDFL #2, respectively.

Figure 4C:
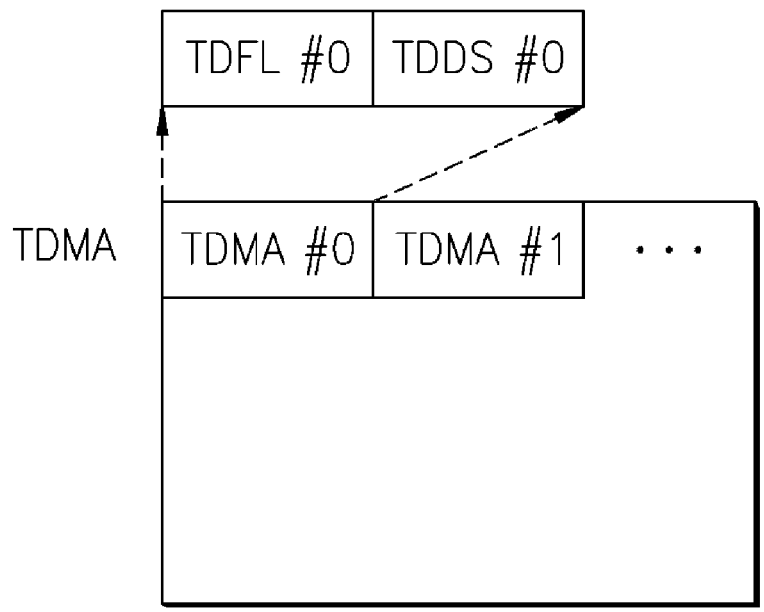

Referring to FIG. 4C, corresponding temporary defect information and temporary defect management information are a pair of information in a corresponding temporary management information recorded in the temporary defect management area (TDMA). That is, temporary management information TDMA #0, TDMA #1, TDMA #2 are sequentially recorded starting from the start of the temporary defect management area toward an ending point thereof. The temporary management information TDMA #0 contains a corresponding pair of the temporary defect management information TDDS #0 and the temporary defect information TDFL #0. The temporary management information TDMA #1 contains a corresponding pair of the temporary defect management information TDDS #1 and the temporary defect information TDFL #1. The temporary management information TDMA #2 contains a corresponding pair of the temporary defect management information TDDS #2 and the temporary defect information TDFL #2.

Figure 4D:
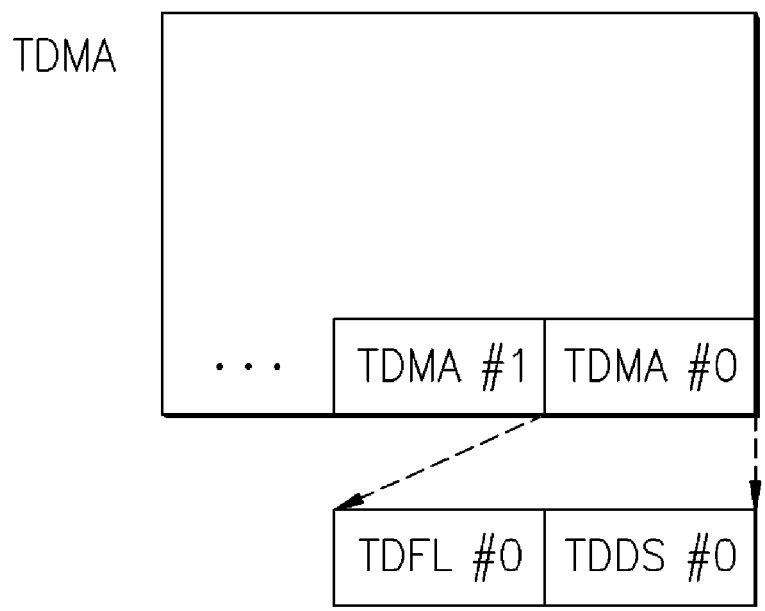

Referring to FIG. 4D, compared to the temporary defect management area of FIG. 4C, corresponding temporary defect information and temporary defect management information are a pair of information in a corresponding temporary management information recorded in a temporary defect management area, but the sequence of recording the information is not the same. That is, temporary management information TDMA #0, TDMA #1, TDMA #2 are sequentially recorded starting from the end of the temporary defect management area toward the start thereof. The temporary management information TDMA #0, TDMA #1, and TDMA #2 contain a pair of the corresponding temporary defect management information TDDS #0 and temporary defect information TDFL #0, a pair of the corresponding temporary defect management information TDDS #1 and temporary defect information TDFL #1, and a pair of the corresponding temporary defect management information TDDS #2 and temporary defect information TDFL #2, respectively.

Figure 5:
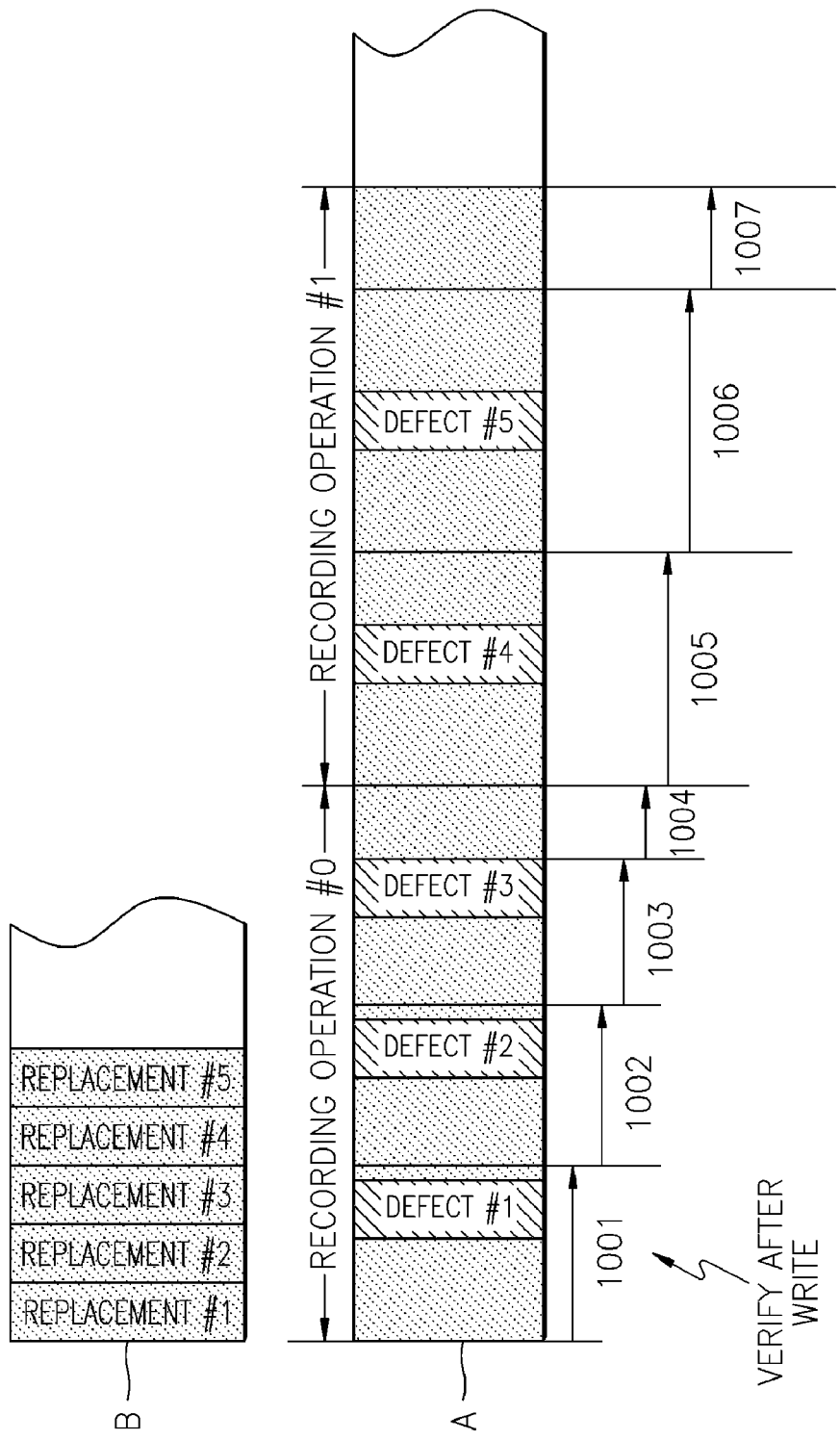
FIG. 5 illustrates recording of data in a user data area and a spare area, according to an embodiment of the present invention.

FIG. 5 illustrates recording of data in a user data area A and a spare area B according to an embodiment of the present invention. Data can be processed in units of sectors or clusters. A sector denotes a minimum unit of data that can be managed in a file system of a computer or in an application. A cluster denotes a minimum unit of data that can be physically recorded on a disc at once. In general, one or more sectors constitute a cluster.

There are two types of sectors: a physical sector and a logical sector. The physical sector is an area on a disc where a sector of data is to be recorded. An address for detecting the physical sector is called a physical sector number (PSN). The logical sector is a unit in which data can be managed in a file system or an application. An address for detecting the logical sector is called a logical sector number (LSN). A disc recording/reproducing apparatus such as that shown in FIG. 1 detects the recording position of data using a PSN, and when recording data on the disc 100, the entire data is managed in units of LSNs in a computer or an application and the position of data is detected using the LSN. The relationship between an LSN and a PSN is changed by a controller 2 of the recording/reproducing apparatus, based on whether the disc 100 contains a defect and an initial position of recording data.

Referring to FIG. 5, A denotes a user data area and B denotes a spare area in which PSNs are allocated to a plurality of sectors (not shown) in ascending order. In general, each LSN corresponds to at least one PSN. However, since LSNs are allocated to non-defective sectors in ascending order, the correspondence between the PSNs and the LSNs is not maintained when the disc 100 has a defective area, even if the size of a physical sector is the same as that of a logical sector.

In the data area A, sections 1001 through 1007 denote predetermined units of data in which the verify-after-write method is performed. A recording apparatus records user data in section 1001, returns to the start of section 1001, and checks if the user data is appropriately recorded or a defect exists in section 1001. If a defect is detected in a portion of section 1001, the portion is designated as defect #1. The user data recorded in defect #1 is also recorded on a portion of the spare area B. Here, the portion of the spare area B in which data recorded in defect #1 is rewritten is called replacement #1.

Next, the recording apparatus records user data in section 1002, returns to the start of section 1002, and checks whether the data is properly recorded or a defect exists in section 1002. If a defect is detected in a portion of section 1002, the portion is designated as defect #2. Likewise, replacement #2 corresponding to defect #2 is formed in the spare area B. Further, defect #3 and replacement #3 are designated in section 1003 of the user data area A and the spare area B, respectively. In section 1004, a defect does not occur and a defective area is not designated.

The recording apparatus records information regarding defect #1, #2, and #3 occurring in sections 1001 through 1003 as temporary defect information TDFL #0 in the temporary defect management area when recording operation #0 is expected to end, after the recording and verifying of data to section 1004, i.e., when a user presses the eject button of a recording apparatus or recording of user data allocated in a recording operation is complete. Also, defect management information for managing the temporary defect information TDFL #0 is recorded as temporary defect management information TDDS #0 in the temporary defect management area.

When recording operation #1 starts, data is recorded in sections 1005 through 1007 and defects #4 and #5 and replacements #4 and #5 are formed in the user data area A and the spare area B in the temporary defect management area, respectively, as explained with respect to sections 1001 through 1004. If the second recording operation is expected to end, the recording apparatus records information regarding defects #4 and #5 as temporary defect information TDFL #1, and records the information contained in the temporary defect information TDFL #0 once again. Thereafter, defect management information for managing the temporary defect information TDFL #1 is recorded in the temporary defect management area.

Figure 6A:
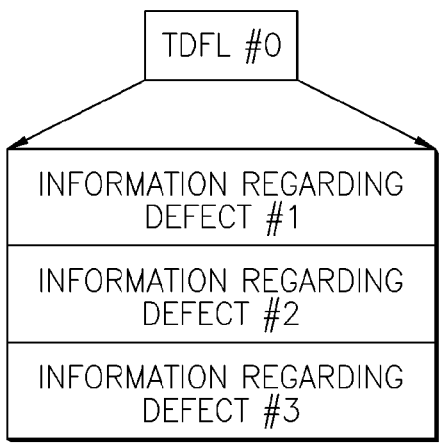
FIGS. 6A, 6B and 7 illustrate data structures of temporary defect information TDFL #0 and TDFL #1 according to embodiments of the present invention.
Figure 6B:
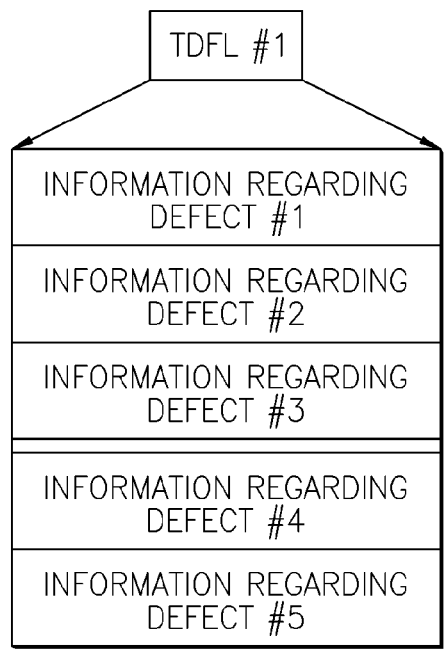
Figure 7:
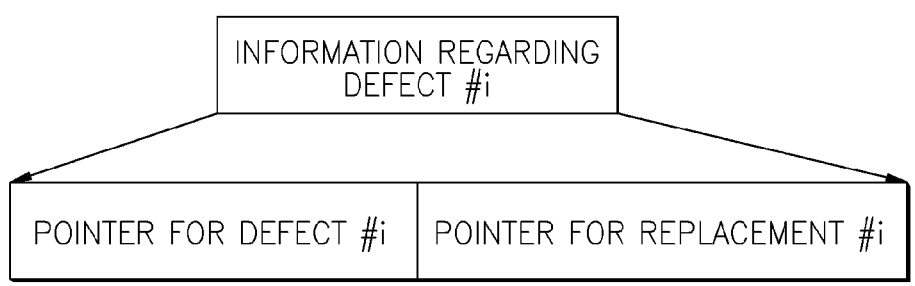

FIGS. 6A and 6B illustrate data structures of temporary defect information TDFL #0 and TDFL #1 according to an embodiment of the present invention. FIG. 7 illustrates a data structure of information regarding defect #i.

Referring to FIGS. 6A and 6B, the temporary defect information TDFL #0 contains information regarding defects #1 through #3. In detail, the information regarding defect #1 indicates the position of an area in which defect #1 exists and the position of an area in which replacement #1 is recorded. The information regarding defect #2 indicates the position of an area in which defect #2 exists and the position of an area in which replacement #2 is recorded. The information regarding defect #3 indicates the position of an area in which defect #3 exists and the position of an area in which replacement #3 is recorded.

The temporary defect information TDFL #1 further contains information regarding defects #4 and #5 in addition to the information contained in the temporary defect information TDFL #0. That is, the temporary defect information TDFL #1 includes the information regarding defect #1, the information regarding defect #2, the information regarding defect #3, the information regarding defect #4, and the information regarding defect #5.

Referring to FIG. 7, the information regarding defect #i describes a pointer pointing to defect #i and a pointer pointing to replacement #i. In detail, the pointer for defect #i specifies the starting and ending points of the defect #i, and the pointer for replacement #i specifies the starting and ending points of the replacement #i.

Figure 8:
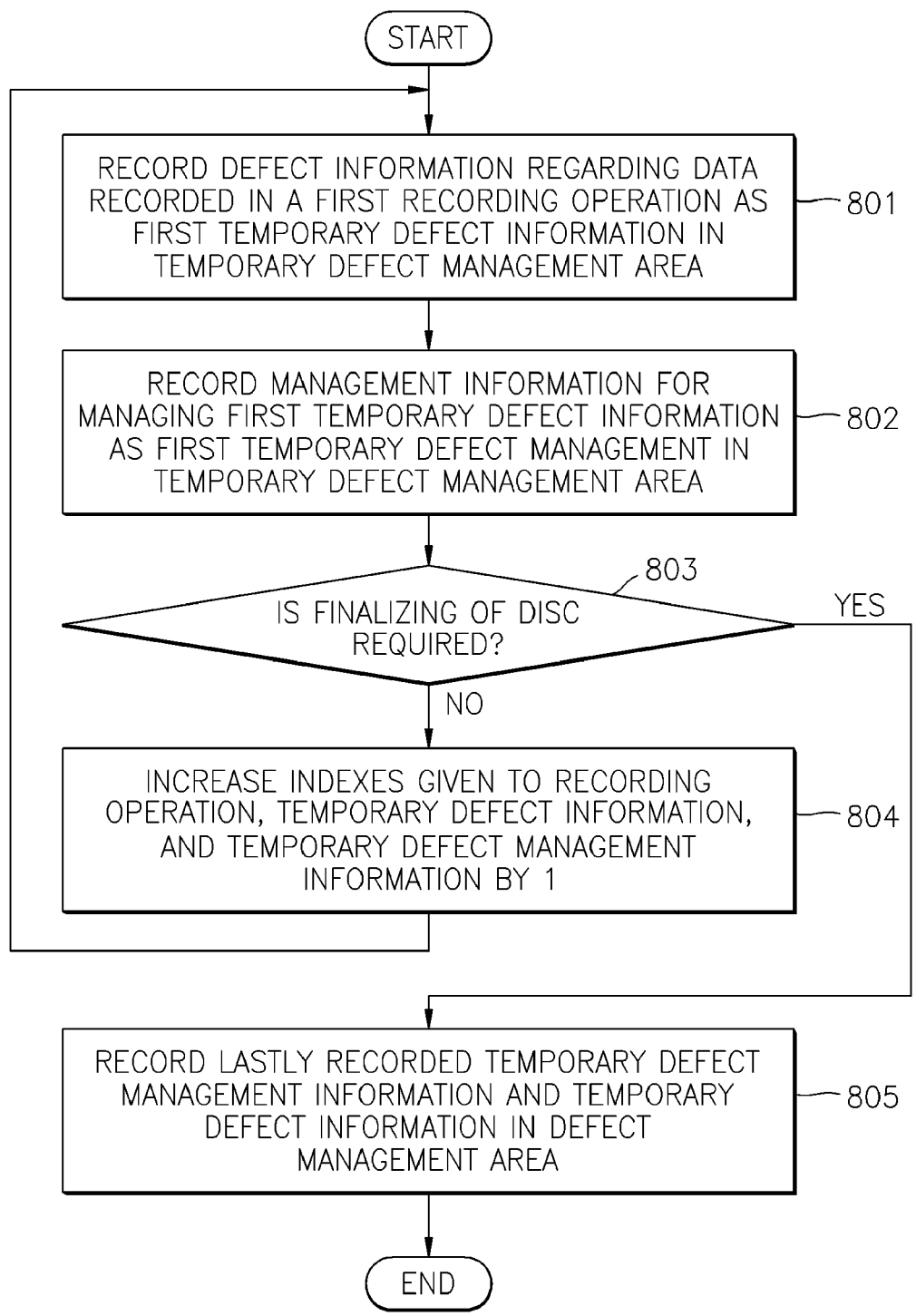
FIG. 8 is a flowchart illustrating a defect management method according to an embodiment of the present invention.

Hereinafter, a defect management method according to an embodiment of the present invention will be described with reference to FIG. 8. Referring to FIG. 8, in action 801, a recording apparatus records defect information regarding data recorded according to a first recording operation as first temporary defect information in a temporary defect management area of a disc. This process serves to manage disc defects. In action 802, management information for managing the first temporary defect information is recorded as first temporary defect management information in the temporary defect management area.

In action 803, it is checked whether the disc needs to be finalized. In action 804, if it is determined in action 803 that the disc does not need to be finalized, actions 801 and 802 are repeated while increasing indexes given to the recording operation, temporary defect information, and temporary defect management information by 1. However, it is understood that other numbers can be used for the index to the extent that the numbers serve to distinguish sets of recorded data.

In action 805, if it is determined in action 803 that the disc needs to be finalized, a last recorded temporary defect management information and a last recorded temporary defect information are recorded in a defect management area. That is, the last recorded temporary defect management information and the last recorded temporary defect information are recorded as the final temporary defect management information and temporary defect information in the defect management area (DMA). The final temporary defect management information and temporary defect information may be repeatedly recorded so as to increase the reliability of data detection according to an aspect of the invention.

Also, the verify-after-write method may be performed on the final temporary defect management information and the final temporary defect information according to an aspect of the invention. If a defect is detected from final temporary defect management information and the final temporary defect information, an area of the disc in which the defect occurs and data recorded after the area having the defect may be regarded as being unavailable (i.e., the areas of the final temporary defect management information and the final temporary defect information are designated as a defective area) and the final temporary defect management information and the final temporary defect information may be again recorded after the defective area.

Figure 9:
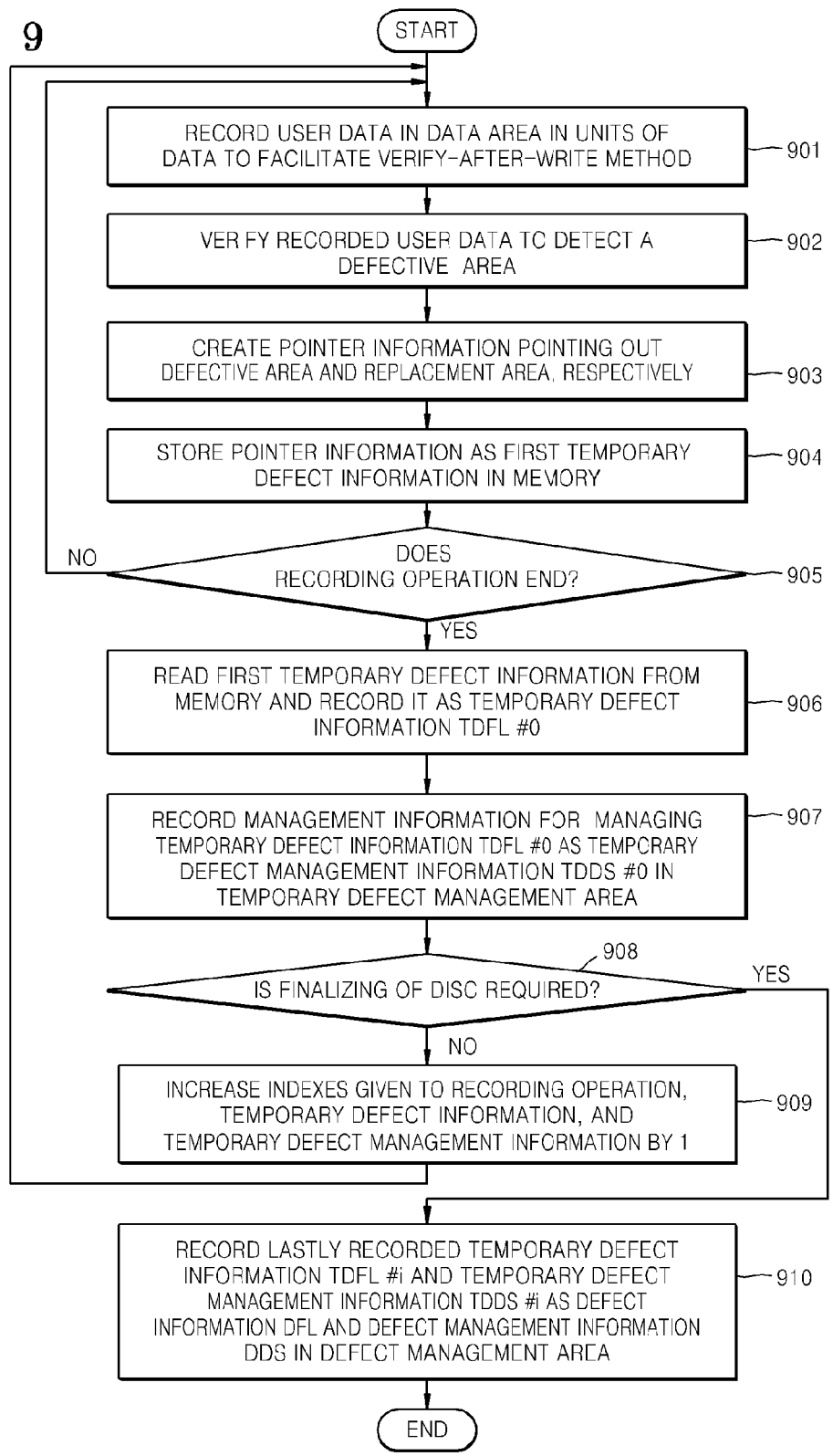
FIG. 9 is a flowchart illustrating a defect management method according to another embodiment of the present invention.

FIG. 9 is a flowchart illustrating a disc defect management method according to another embodiment of the present invention. Referring to FIG. 9, a recording apparatus records user data in a data area in units of data to facilitate the verify-after-write method (in action 901). In action 902, the user data recorded in action 901 is verified to detect the existence of defects in any area of the disc 100. In action 903, the controller 2 of FIG. 1 designates the area having the defect as a defective area, rewrites the user data recorded in the defective area in a spare area to create a replacement area, and creates pointer information pointing to the defective area and the replacement area, respectively. In action 904, the pointer information is stored as first temporary defect information in the memory 3 of FIG. 1. In action 905, it is checked whether the recording operation is expected to end. If it is determined in action 905 that the recording operation is not likely to end, actions 901 through 904 are repeated.

However, in action 906, if it is determined in step 905 that the recording operation is likely to end (i.e., when the recording of the user data is complete by user input or according to the recording operation), the controller 2 reads temporary defect information #0 from the memory 3 and records the temporary defect information #0 as temporary defect information TDFL #0 in a temporary defect management area. In action 907, management information for managing temporary defect information TDFL #0 is recorded as temporary defect management information TDDS #0 in the temporary defect management area.

In action 908, it is checked whether the disc 100 needs to be finalized. If it is determined in action 908 that the finalizing of the disc 100 is not needed, actions 901 through 907 are repeated while indexes given to the recording operation, temporary defect information, and temporary defect management information are increased by 1. However, it is understood that other numbers can be used for the index to the extent that the numbers serve to distinguish sets of recorded data.

In action 910, if it is determined in action 908 that finalization of the disc 100 is needed, a last recorded temporary defect information TDFL #i and a last recorded temporary defect management information TDDS #i are recorded as defect information DFL and defect management information DDS in a defect management area (DMA). The defect information DFL and defect management information DDS may be repeatedly recorded several times to increase the reliability of data detection according to an aspect of the invention.

Further, the verify-after-write method may be performed on the defect information DFL and defect management information DDS according to an aspect of the invention. If a defect is detected from those DFL and DDS, an area having the defect and data recorded after the area having the defect may be regarded as being unavailable (, i.e., the area including the DFL and DDS is designated as a defective area), and the defect management information and defect information may be again recorded after the defective area.

The aforementioned defect management method may be embodied as a computer program that can be run by a computer. Codes and code segments, which constitute the computer program, can be easily reasoned by a computer programmer in the art. The program is stored in a computer readable medium. When the program is read and run by a computer, the defect management method according to the present invention is performed by the computer. Here, the computer-readable medium may be a magnetic recording medium, an optical recording medium, a carrier wave medium firmware or other recordable medium.

While not required in all aspects, it is understood that the controller 2 can be a computer implementing the method using the computer program encoded on a computer readable medium. The computer can be implemented as a chip having firmware, or can be a general or special purpose computer programmable to perform the method.

In addition, it is understood that, in order to achieve a recording capacity of several dozen gigabytes, the recording and/or reproducing unit 1 could include a low wavelength, high numerical aperture type unit usable to record dozens of gigabytes of data on the disc 100. Examples of such units include, but are not limited to, those units using light wavelengths of 405 nm and having numerical apertures of 0.85, those units compatible with Blu-ray discs, and/or those units compatible with Advanced Optical Discs (AOD).

As described above, the present invention provides disc defect management that is applicable to discs. According to an aspect of the present invention, a temporary defect information area is present in a lead-in area and/or a lead-out area, so that defect information can be accumulatively recorded. Also, during finalization of a disc, only last recorded temporary defect information is read from a temporary defect management area and is recorded in a defect management area, thereby enabling efficient use of the defect management area. Accordingly, it is possible to record user data on even a write-once disc while performing defect management, thereby more stably backup operations can be performed without interruptions.

While described in terms of a write-once disc, it is understood that the method can be used with rewritable media or where the medium has write-once and rewritable portions.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of managing disc defects in a disc, the disc comprising a data area, and a temporary defect management area in a lead-in area and/or a lead-out area, the method comprising:
   recording Nth temporary defect information in the temporary defect management area, the Nth temporary defect information comprising N−1th temporary defect information, and defect information regarding data recorded in the data area after the N−1th temporary defect information was recorded;
   recording temporary defect management information corresponding to the Nth temporary defect information in the temporary defect management area, the temporary defect management information corresponding to the Nth temporary defect information comprising management information for managing the Nth temporary defect information;
   detecting whether there is a defect in the recorded Nth temporary defect information;
   if a defect is detected in the recorded Nth temporary defect information, recording, in the temporary defect management area, data corresponding to a part of the recorded Nth temporary defect information in which the defect is detected;
   recording N+1th temporary defect information in the temporary defect management area, the N+1th temporary defect information comprising the Nth temporary defect information, and defect information regarding data recorded in the data area after the Nth temporary defect information was recorded;
   recording temporary defect management information corresponding to the N+1th temporary defect information in the temporary defect management area, the temporary defect management information corresponding to the N+1th temporary defect information comprising management information for managing the N+1th temporary defect information; and
   recording a last recorded temporary defect management information and a last temporary defect information in a defect management area provided in the lead-in area and/or the lead-out area.

2. The method of claim 1, wherein the recording of the last recorded temporary defect management information is performed during finalization of the disc.

3. A reproducing apparatus usable with a write-once storage medium, the write-once storage medium comprising a user data area, a temporary defect management area, and a defect management area, the reproducing apparatus comprising:
   a recording/reading unit to record data on and/or read data from the write-once storage medium; and
   a controller to control the recording/reading unit to:
      read defect information from the defect management area of the write-once storage medium; and
      read user data from the user data area of the write-once storage medium using the defect information;
   wherein the defect information was recorded in the defect management area during finalization of the write-once storage medium;

the defect information is a last temporary defect information that was lastly recorded in the temporary defect management area before the finalization of the write-once storage medium;

the last temporary defect information comprises:
 previous temporary defect information; and
 defect information regarding data recorded in the user data area after the previous temporary defect information was recorded; and if a defect was detected in the recorded last temporary defect information after the last temporary defect information was lastly recorded in the temporary defect management area, the temporary defect management area comprises data corresponding to a part of the recorded-last temporary defect information in which the defect was detected.

4. A recording apparatus usable with a write-once storage medium, the write-once storage medium comprising a user data area, a temporary defect management area, and a defect management area, the recording apparatus comprising:

a recording/reading unit to record data on and/or read data from the write-once storage medium; and a controller to control the recording/reading unit to record defect information in the defect management area of the write-once storage medium during finalization of the write-once storage medium;

wherein the defect information is a last temporary defect information that was lastly recorded in the temporary defect management area before the finalization of the write-once storage medium;

the last temporary defect information comprises:
 previous temporary defect information; and
 defect information regarding data recorded in the user data area after the previous temporary defect information was recorded; and if a defect was detected in the recorded last temporary defect information after the last temporary defect information was lastly recorded in the temporary defect management area, the temporary defect management area comprises data corresponding to a part of the recorded last temporary defect information in which the defect was detected.

5. A write-once storage medium comprising:

a user data area;

a temporary defect management area comprising last temporary defect information that was lastly recorded in the temporary defect management area before finalization of the write-once storage medium, the last temporary defect information comprising:
 previous temporary defect information; and
 defect information regarding data recorded in the user data area after the previous temporary defect information was recorded; and a defect management area comprising defect information that was recorded in the defect management area during the finalization of the write-once-storage medium;

wherein the defect information recorded in the defect management area is the last temporary defect information that was lastly recorded in the temporary defect management area before the finalization of the write-once storage medium; and if a defect was detected in the recorded last temporary defect information after the last temporary defect information was lastly recorded in the temporary defect management area, the temporary defect management area comprises data corresponding to a part of the recorded last temporary defect information in which the defect was detected.

* * * * *